Dec. 31, 1968   J. T. WAGNER ET AL   3,418,806
ELASTIC FLUID TURBINE APPARATUS
Filed Nov. 14, 1966   Sheet 1 of 2

WITNESSES:
Bernard R. Gegner
James F. Young

INVENTORS
John T. Wagner and
Ozro N. Bryant.
BY
Frank Cristaudo Jr.

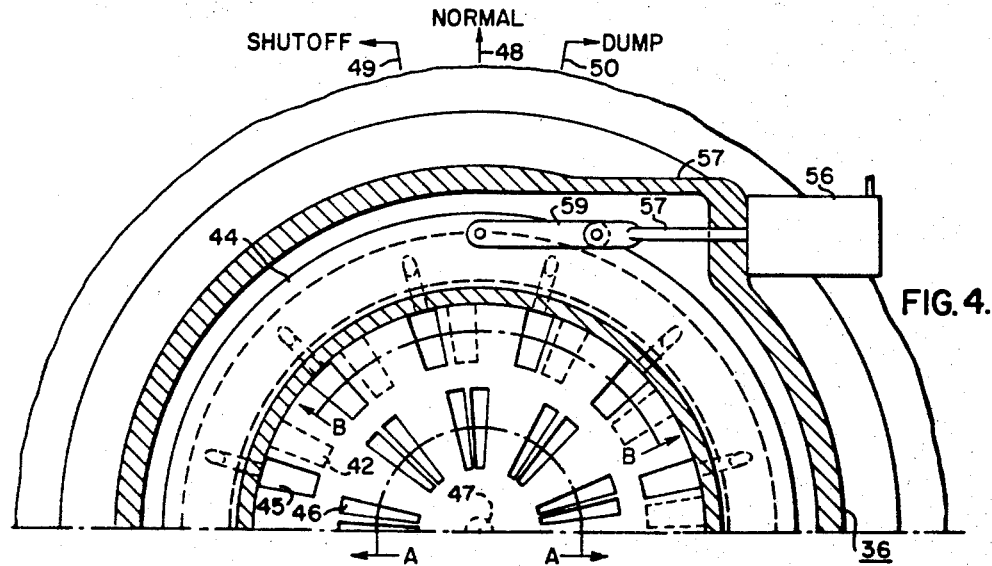
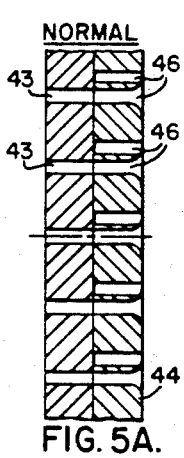
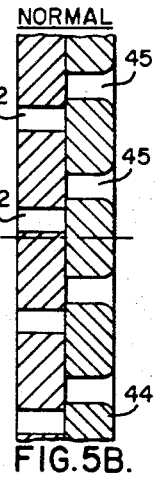
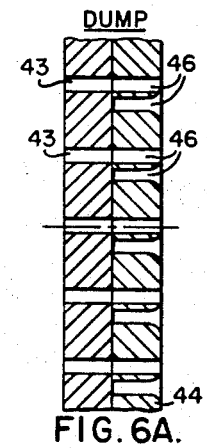
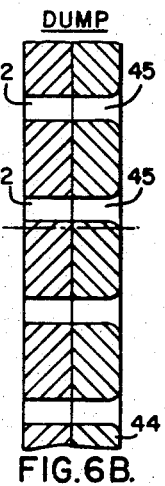
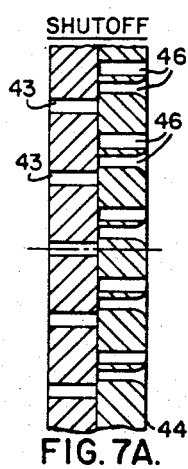
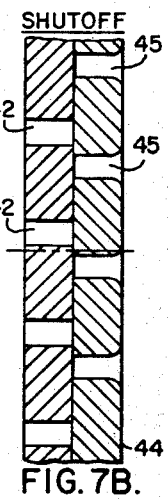

United States Patent Office 3,418,806
Patented Dec. 31, 1968

3,418,806
ELASTIC FLUID TURBINE APPARATUS
John T. Wagner, Lansdowne, and Ozro N. Bryant, Chester, Pa., assignors to Westinghouse Electric Corporation, Pittsburgh, Pa., a corporation of Pennsylvania
Filed Nov. 14, 1966, Ser. No. 593,984
5 Claims. (Cl. 60—39.51)

ABSTRACT OF THE DISCLOSURE

This invention relates to a gas turbine driven electrical generating power plant in which the compressed air is preheated by exhaust gases from the turbine by sending the air through a recuperator in the stack. In accordance with the invention there are provided a plurality of grid valves associated with the air conduits at the recuperator. The valves are normally positioned to direct air through the recuperator to the turbine combustion chambers, but are movable to a "dump" position to direct the compressed air to the exhaust gas stack in the event of sudden loss of electrical load, to prevent overspeeding of the turbine. The valves may also be moved to an "off" position individually to interrupt air flow through a portion of the recuperator to cause localized overheating of the recuperator for burning away deposits formed by the exhaust gases.

---

This invention relates to elastic fluid turbine power plants, more particularly to gas turbine power plants in which the compressed air for combustion is regeneratively heated by the exhaust gases from the turbine, and has for an object to provide an improved power plant of this type.

In gas turbine power plants of the above type, the compressed air from the compressor is directed through a recuperative heat exchanger disposed in the stack through which the exhaust gases from the turbine are directed to the atmosphere, thereby to recover some of the heat that would otherwise be lost from the system.

In a gas turbine power plant of the above type, in the event of a sudden loss in load carried thereby, for example, an electric generator load, the turbine has a tendency to overspeed to a dangerous degree even though the usual controls are employed to reduce the rate of fuel flow to the combustion apparatus.

One of the principal objetcs of the invention is to minimize this dangerous tendency by terminating the flow of compressed air to the combustion apparatus in the event of sudden loss of load on the turbine.

Another object is to provide apparatus of the above type in which the compressed air is bypassed to the turbine exhaust stack to minimize the above tendency of the turbine to overspeed on sudden loss of load.

A further object is to provide a plural position unitary valve structure adapted to control the flow of compressed air in apparatus of the above type in a manner to (1) permit flow to the combustion apparatus, (2) interrupt flow to the combustion apparatus, and (3) bypass the combustion apparatus and dump the air into the exhaust stack of the turbine.

Another object is to provide an improved plural position unitary valve of the movable grid type arranged to permit normal flow, block flow and divert flow by movement to appropriate positions.

A still further object is to provide a power plant system of the above type in which at least a part of the recuperative heat exchanger is bypassed when desired so that the heat exchanger may be heated to a higher temperature than that attained in normal operation, with attendant burning away of fouling exhaust gas deposits thereon.

Briefly, in accordance with the invention, the recuperative heat exchanger disposed in the gas turbine exhaust duct or stack is provided with one or more unitary valve structures ported in a manner to direct the compressed air for combustion through the heat exchanger in normal operation.

The valve structures are also cooperatively associated with the passageway in the stack and ported in a manner to direct the compressed air to the stack when moved to a second position. In the second position the ports to the heat exchanger are preferably maintained in the open position, so that the entrapped volume or mass of compressed air in the heat exchanger may also be directed to the stack, thereby to terminate or at least minimize the supply of pressurized motive fluid to the turbine and prevent overspeeding thereof in the event of sudden loss in turbine load.

During normal operation, the valves may be moved to a third position individually, from time to time, at the discretion of the operator, thereby to interrupt flow of air through the associated portion of the heat exchanger, and render it susceptible to overheating by the turbine exhaust gases with a beneficial effect of burning away of combustion gas deposits thereon, so that the efficiency of heat transfer is substantially restored to its original design value.

The above and the objects are effected by the invention as will be apparent from the following description and claims taken in connection with the accompanying drawings, forming a part of this aplication, in which:

FIG 4 is a transverse sectional view taken on line IV—IV of FIG. 2;

FIGS. 5A and 5B are developed sectional views taken along lines A—A and B—B of FIG. 4, respectively, with the valve ports in the "Normal" position;

FIGS. 6A and 6B are views similar to FIGS. 5A and 5B, but with the valve ports in the "Dump" position; and FIGS. 7A and 7B are views similar to FIGS. 5A and 5B, but with the valve ports in the "Shutoff" position.

Figure 1:
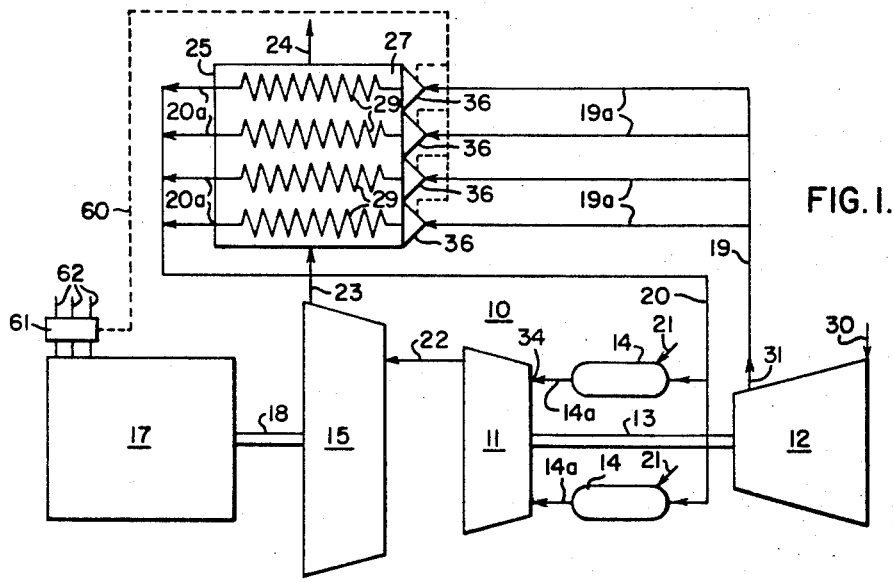
FIGURE 1 is a diagrammatic view of a gas turbine power plant employing the invention.

Referring to the drawings in detail, FIG. 1 illustrates a gas turbine power plant 10 having a gas turbine 11, an air compressor 12 drivenly connected to the gas turbine 12 by a shaft 13, and combustion apparatus 14 for providing hot motive combustion gases to the turbine 11. There is further provided a second gas turbine 15 (usually called the power turbine) drivingly connected to a suitable load such as an electrical generator 17 by a shaft 18.

The compressor 12 is employed to provide compressed air to the combustion apparatus 14 by way of suitable conduit structures 19 and 20 to support the combustion of fuel injected therein in any suitable manner, as indicated by the arrows 21. Accordingly, hot pressurized gaseous products of combustion are generated in the combustion apparatus and directed through outlets, indicated 14a to provide the motive fluid for motivating the turbines 11 and 15.

The motive fluid is only partially expanded in the turbine 11 to the degree required to drive the compressor 12 and is thence directed to the power turbine 15 as indicated by the line 22 to motivate the turbine 15, as required to drive the generator 17. After substantially complete expansion in the power turbine 15, the vitiated or spent gases are directed to the surrounding atmosphere as indicated by the arrows 23, 24 by way of an exhaust duct or stack 25.

The stack, as illustrated, defines an upwardly extending passageway 27 for conducting the hot exhaust gases, and within the stack there is disposed a heat exchanger comprising a plurality of tubular structures 29 disposed in good heat exchange relation with the gases. The tubular structures 29 are interposed between the conduits 19 and 20 and are disposed in parallel flow relative with each other. Accordingly the conduit 19 may be provided with parallel branch conduits 19a and the conduit 20 may be similarly provided with branch conduits 20a to afford the above mentioned parallel flow relationship of the tubular structures 29.

As thus far described, the apparatus is substantially conventional and operates in the following manner. Air is drawn into the compressor 12 through its inlet 30, compressed and then directed through its outlet 31 through the conduits 19, 19a to the heat exchanger structure 29, and the conduits 20a, 20 to the combustion apparatus 14 to support the combustion of fuel injected thereinto as indicated at 21.

The resulting hot pressurized products of combustion are thence delivered to the turbine 11 through its inlet 34 to motivate the same and the turbine 11 thus drives the compressor 12 to sustain the above operation.

After partial expansion in the turbine 11, the combustion gases are directed through the turbine 15 to motivate the same and the turbine 15 thus drives the generator 17, and the vitiated gases are thence expelled to the atmosphere through the stack 27.

The exhaust gases contain considerable sensible heat and as they flow upwardly along the stack passageway 27 about the heat exchanger 29, the compressed air flowing through the heater exchanger is heated and the exhaust gases are cooled in the resulting heat exchange. Accordingly, the compressed air is regeneratively preheated before admitting it to the combustion apparatus, and some of the heat energy that would otherwise be wasted is returned to the system.

The power plant 10 may be provided with any suitable fuel control apparatus (not shown) responsive to turbine speed and/or generator load, so that in the event of reduction in load the tendency for the turbine speed to rise above a selected speed is effective to effect a corresponding reduction in the rate of fuel admission to the combustion apparatus 14, as well known in the art.

However, even though the power plant is provided with the usual speed controls, in the event of a sudden loss of load the power turbine 15 will tend to accelerate rapidly to a dangerous overspeed condition. This undesirable effect is promoted by the energy of the large mass of compressed air present in the conduits 19 and 20 and the heat exchanger tubes 29 which is effective to continue motivation of the turbines 11 and 15 for a period even after fuel combustion is terminated in response to an overspeed condition.

In accordance with the invention, a plurality of valve structures 36 are provided, preferably one associated with each conduit branch 19a and heat exchange tubular structure 29, to control the flow of compressed air through its associated heat exchange tube structure.

Figure 2:
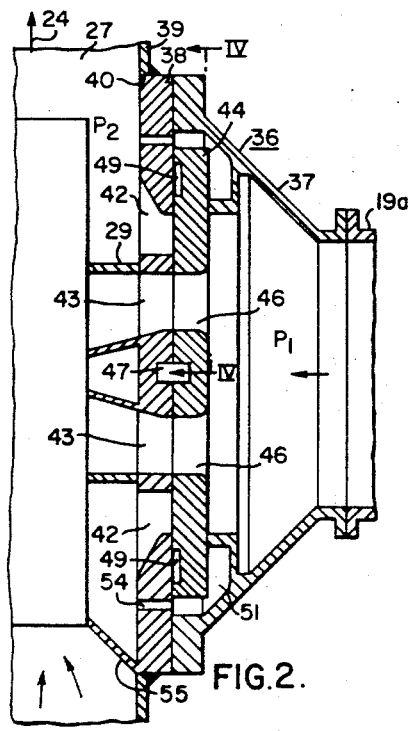
FIG. 2 is a central axial section through a plural position grid valve employed, in accordance with one aspect of the invention, in the plant illustrated in FIG. 1.
Figure 3:
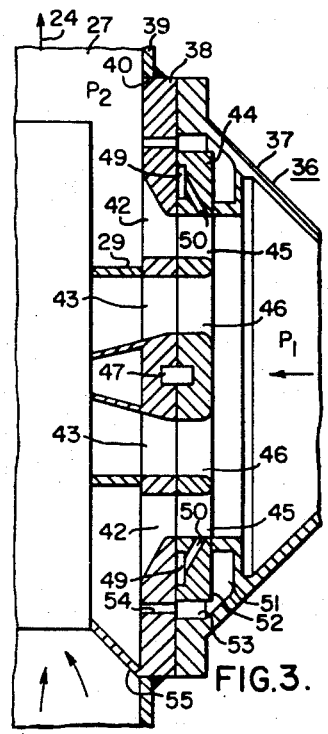
FIG. 3 is a view similar to FIG. 2 but illustrating the valve in another position.

As best shown in FIGS. 2, 3 and 4 each of the valve structures 36 is of generally frusto-conical shape with a frusto-conical inlet portion 37 connected to the branch conduit 19a and a circular stationary grid member 38 attached to the outer wall 39 of the stack 25 in registry with a circular opening 40 formed therein.

The stationary grid member 38 is provided with a radially outermost annular array of outlet ports 42 communicating with the exhaust gas passageway 27 and a radially innermost annular array of outlet ports 43 communicating with the heat exchange tube structure 29.

There is further provided a movable grid member 44 of circular shape having a radially outermost array of inlet ports 45 and a radially innermost array of inlet ports 46. The moveable grid member 44 is disposed in slidable face-to-face abutment with the stationary grid member 38 and is rotatably mounted thereon in any suitable manner, for example by a dowel pin 47.

The valve structure 39, as best shown in FIG. 4 has three operative positions, a central or "Normal" position 48, a left or "Shutoff" position 49 and a right or "Dump" position 50, attained by rotation of the movable grid member 44.

The movable grid member 44 has twice as many inlet ports 46 as the stationary grid 38 has outlet ports 43 and as many inlet ports 45 as the stationary grid has outlet ports 42.

The grid 44 of the valve is shown in the "Normal" position 48 in FIG. 4 and the ports 43, 46 and 42, 45 are so spaced relative to each other that when the valve is in the "Normal" position, as best seen in FIGS. 2, 5A and 5B, the ports 43 are in registry with alternate ports 46 while the ports 42 are out of registry with the ports 45, so that flow therethrough is blocked. Accordingly, flow of compressed air through the open ports 43 and 46 to the heat exchanger tube 29 is permitted.

When the movable grid member is moved to the "Dump" position 50, as best shown in FIGS. 3, 6A and 6B, alternate ports 46 are moved into registry with the stationary ports 43, while the movable ports 45 are moved into registry with the stationary ports 42. Accordingly, both the branch conduit 19a and the heat exchanger structure 29 are disposed in communication with the exhaust passageway 27 and the compressed air is dumped to the surrounding atmosphere by way of the stack 25.

When the movable grid member 44 is moved to the "Shutoff" position 49, as best shown in FIGS. 7A and 7B, the movable ports 46 are moved out of registry with the stationary ports 43, thereby blocking fluid flow therethrough, and the movable ports 45 are moved out of registry with the stationary ports 42 thereby blocking fluid flow therethrough. Accordingly, flow of compressed air past the valve is terminated.

Since the pressure $P_1$ of the compressed air in the valve inlet 37 is considerably higher than the pressure $P_2$ in the exhaust gas passageway, the differential pressure $P_1-P_2$ across the grid members 44 and 38 may be so great that great effort would be required to move the grid member 44 from one position to another. Accordingly, the major portion of this differential pressure may be balanced in any suitable manner, for example, by provision of an annular cavity 49 at the interfacial surface between the two grid members and subjecting the cavity to the valve inlet pressure $P_1$ by means of orifices 50 and by provision of an annular cavity 51 adjacent the upstream face 52 of the movable grid member 44 and subjecting the cavity 51 to the exhaust gas pressure $P_2$ by means of registering openings 53 and 54.

Also, a baffle plate 55 is provided to prevent exhaust gases from bypassing the heat exchanger in normal operation.

The movable grid 44 may be moved from one position to another in any suitable manner. However, in FIG. 4 there is shown a fluid actuated power piston unit 56 mounted on the outer casing 57 of the valve and having its piston rod 58 drivingly connected to the movable grid member 44 by an intermediate link 59.

The servomotors 56 associated with each valve structure 36 may be operated in any desirable manner. For example, they may be normally maintained in the Normal or central position 48 and one or more may be moved to the "Shutoff" position 49 during moderately reduced load conditions on the generator 17, in response to a reduced electrical power signal 60 generated by a suitable electrical load sensing device 61 associated with the generator output conductors 62. However, they may all be jointly moved to the "Dump" position 50 during a sudden heavy reduction in electrical load or complete loss of electrical load. Load sensing devices of this type are well known in the art and hence no further description or illustration is required.

Also, during operation one or more of the servomotors 56 may be moved to the shutoff position at the discretion of the operator thereby permitting the tubular heat exchange structure 29 associated therewith to overheat with resulting burning away of exhaust gas deposits on the outer surface thereof. During such operation, compressed air flow through the other valves in the normal "open" position will continue to provide the air for combustion of the fuel. Should all of the servomotors 56 be moved to the shutoff position, all air flow to the heat exchange structures is interrupted.

Although only one embodiment has been shown, it will be obvious to those skilled in the art that it is not so limited, but is susceptible of various other changes and modifications without departing from the spirit thereof.

We claim as our invention:

1. In a gas turbine power plant comprising
   an air compressor having an air inlet and a compressed air outlet,
   a gas turbine in driving relation with said compressor and having a motive gas inlet and an exhaust gas outlet,
   a tubular exhaust duct, communicating with said exhaust gas outlet,
   fuel combustion apparatus for generating hot motive gases and having a compresed air inlet and a motive gas outlet connected to said motive gas inlet,
   a heat exchanger disposed in said exhaust duct, and
   conduit means for directing compressed air from said compressed air outlet to said heat exchanger and from said heat exchanger to said compressed air inlet to support fuel combustion in said combustion apparatus, whereby during operation the compressed air is heated by the exhaust gas as it flows through said heat exchanger,
   the improvement comprising valve structure associated with said conduit means, said valve structure being movable from a first position wherein it permits flow of compressed air to said combustion apparatus to a second position wherein it interrupts at least a part of such flow to said combustion apparatus,
   said valve structure including at least one valve and said valve comprises
   a stationary grid member having a first group of ports communicating with the heat exchanger, and a second group of ports communicating with the exhaust duct, and
   a grid member movable from said first position to said second position and having third and fourth groups of ports communicating with the conduit means and co-operatively associated with said first and second groups of ports,
   said first and third groups of ports being disposed in registry with each other to permit flow of compressed air to the heat exchanger, and said second and fourth groups of ports being out of registry with each other to block flow of compressed air to the exhaust duct, when said movable grid member is in said first position, and
   said second and fourth groups of ports being disposed in registry with each other to dump the compressed air from the conduit means into the exhaust duct when said movable grid member is in said second position.

2. The structure recited in claim 1 wherein
   the first and third groups of ports are maintained in registry with each other when the movable grid member is in said position, thereby to dump compressed air therethrough from the heat exchanger to the exhaust duct.

3. The structure recited in claim 1 wherein
   the movable grid member is movable to a third position,
   the first and third ports are disposed out of registry with each other to block flow of compressed air therethrough to the combustion apparatus, and
   the second and third ports are disposed out of registry with each other to block flow of compressed air to the exhaust duct.

4. In combination,
   a casing structure defining an exhaust gas passageway for a turbine,
   a tubular heat exchange structure disposed in said passageway,
   means for conducting a hot exhaust gas through said passageway in heat exchange relation with said heat exchange structure,
   conduit means for conducting a fluid to be heated through said heat exchanger structure, and
   a unitary valve associated with said conduit means and said exhaust passageway for controlling the flow of said fluid,
   said valve having a first position in which the fluid is directed through said heat exchange structure, a second position in which the fluid is dumped into said exhaust passageway, and a third position in which the flow of fluid to said heat exchange structure and said exhaust passageway is interrupted.

5. The structure recited in claim 4, wherein the valve comprises
   a stationary grid member having a first group of ports communicating with the heat exchange structure, and a second group of ports communicating with the exhaust gas passageway, and
   a movable grid member movable to the first, second and third positions and having third and fourth groups of ports communicating with the conduit means and cooperatively associated with said first and second groups of ports, respectively,
   said first and third ports being in registry with each other and said second and fourth ports being out of registry with each other when the valve is in the first position,
   said second and fourth ports being in registry with each other when the valve is in the second position, and
   said first and second and said third and fourth ports are out of registry with each other when the valve is in the third position.

References Cited

UNITED STATES PATENTS 2,670,598   3/1954   Van Millingen ___ 60—39.27 XR

FOREIGN PATENTS 1,286,445   1/1962   France.

CARLTON R. CROYLE, *Primary Examiner.*

U.S. Cl. X.R.

60—39.29; 165—95